United States Patent [19]
Etoh et al.

[11] Patent Number: 5,959,671
[45] Date of Patent: Sep. 28, 1999

[54] ADAPTER SYSTEM FOR CONNECTION AND DISCONNECTION OF PERIPHERAL EQUIPMENT WITH AN ELECTRIC APPARATUS AND HAVING A CAM SYSTEM

[75] Inventors: Kazuhiko Etoh, Tokyo; Kenya Nishiwaki, Yokohama, both of Japan

[73] Assignee: Canon Kabushiki Kaisha, Tokyo, Japan

[21] Appl. No.: 08/711,098

[22] Filed: Sep. 9, 1996

[30] Foreign Application Priority Data

Sep. 14, 1995 [JP] Japan ................................. 7-236966
Sep. 14, 1995 [JP] Japan ................................. 7-236968

[51] Int. Cl.⁶ ........................... H04N 5/225; H01R 13/62
[52] U.S. Cl. ................................. 348/373; 439/157
[58] Field of Search ................................. 348/373, 375, 348/372; 439/156, 157; H04N 5/225

[56] References Cited

U.S. PATENT DOCUMENTS

5,293,242  3/1994  Mamiya ................................. 348/96
5,341,171  8/1994  Mori et al. ............................. 348/375
5,568,198  10/1996  Sakurai et al. ......................... 348/373
5,621,458  4/1997  Mann et al. ............................ 348/232

Primary Examiner—Wendy Garber
Assistant Examiner—Alicia M. Harrington
Attorney, Agent, or Firm—Robin, Blecker & Daley

[57] ABSTRACT

An adapter device for connecting a peripheral equipment such as an electronic camera to an electric apparatus, such as a TV monitor includes a body formed approximately in a rectangular parallepiped shape having respective first and second longitudinally displaced side surfaces extending transversely of the body, a first connector disposed on an upper surface of the body and arranged for connection with the peripheral equipment, a second connector disposed at the first side surface of the body and arranged for connection with the electric apparatus and an operation member disposed at the second side surface of the body and movable transversely of the body for connecting and detaching the peripheral equipment to and from the first connector. The adapter device includes a cam system with multiple cam parts arranged to facilitate connecting and detaching the peripheral equipment to and from the first connector.

45 Claims, 10 Drawing Sheets

ADAPTER SYSTEM FOR CONNECTION AND DISCONNECTION OF PERIPHERAL EQUIPMENT WITH AN ELECTRIC APPARATUS AND HAVING A CAM SYSTEM

BACKGROUND OF THE INVENTION

1. Field of the Invention

This invention relates to an adapter device for connecting a unit of peripheral equipment, such as an electronic camera, to an external apparatus.

2. Description of the Related Art

In the field of electronic cameras in which image information is obtained by means of an image sensor, the recent advancement of digital technology and large-capacity storage technology has made it practicable for the electronic cameras to handle moving-image information or still-image information as digital signals. The digitized image information can be inputted or outputted directly into or out of various system units such as a printer, a host computer, etc.

In cases where the digital image information is to be exchanged between the electronic camera and a TV monitor or a computer, it is necessary to use many signal terminals, unlike in the case of the NTSC video signal system or the like. For this purpose, a connector having an array of terminals is normally employed as an external output terminal, like a connector for a personal computer. However, for the convenience of mounting and demounting and also in respect of reliability, adapter devices having such connectors for exclusive use in the electronic cameras have been developed in various shapes suited to camera bodies.

In general, a camera of the above-stated kind is used repeatedly in two conditions, i.e., a condition in which the camera alone is used at the time of a shooting action and a condition in which the camera is connected to an external apparatus at the time of inputting and outputting of information. With the camera used in this manner, when a recorded image is reproduced on a TV monitor or is inputted to a computer, the following methods are employed.

(1) A recording medium is taken out from the camera and is then mounted on a recording and reproducing apparatus which is either connected to the TV monitor or built in or connected to the computer. Images and sounds are then reproduced by the recording and reproducing apparatus.

(2) The camera is connected through a cable to the TV monitor or the computer so as to input and output images, sounds and control signals directly into or from the TV monitor or the computer.

(3) A camera mounting/connecting device which is constantly connected to the TV monitor or the computer and which is capable of setting the camera thereon to readily connect the camera thereto is used instead of the cable.

The above-stated known system connection methods, however, have presented various problems. For example, the method (1) requires use of a recording and reproducing apparatus. The use of the recording and reproducing apparatus not only causes the size of the system to increase but also makes it impossible to reproduce the record if the recording medium is not of the same kind. Besides, the method (1) does not apply to a camera which is arranged to record signals on a built-in memory and which does not permit use of an interchangeable recording medium.

The method (2) requires a manual action for connection of the cable, which is troublesome particularly in the case of a computer having a connector on the rear side thereof. The trouble may be avoidable by leaving the cable in a connected state. However, the cable connection might come off a desk or a stand to cause some inconvenience. Besides, with the camera connected to the cable, the camera tends to be pulled and caused to drop off the desk by the weight of the cable and thus might be damaged.

The method (3), on the other hand, necessitates some additional space for setting the camera mounting/connecting device on a desk or a stand.

Figure 9A:
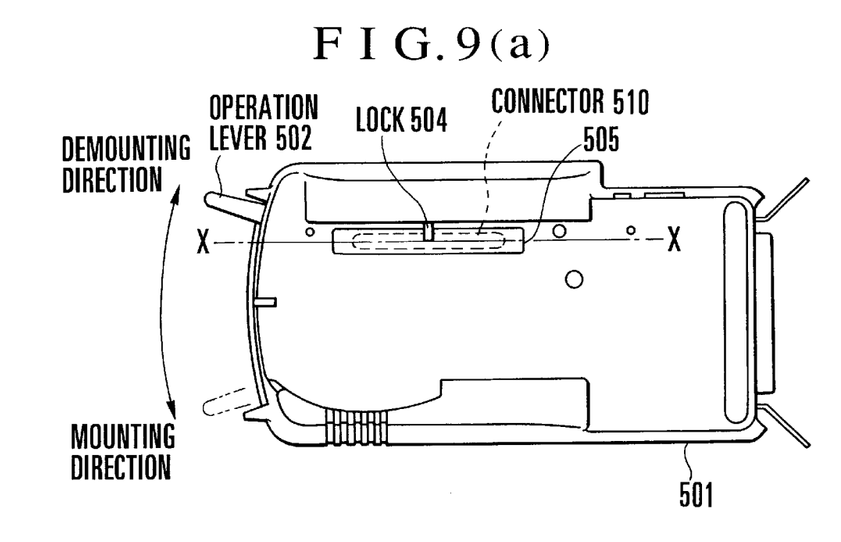
FIGS. 9(a) to 9(c) show by way of example the appearance on three sides of a prototype of adapter device.
Figure 9B:
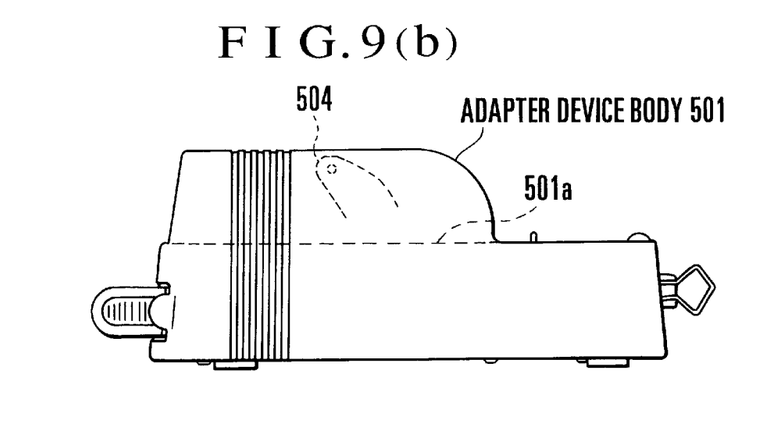
Figure 9C:
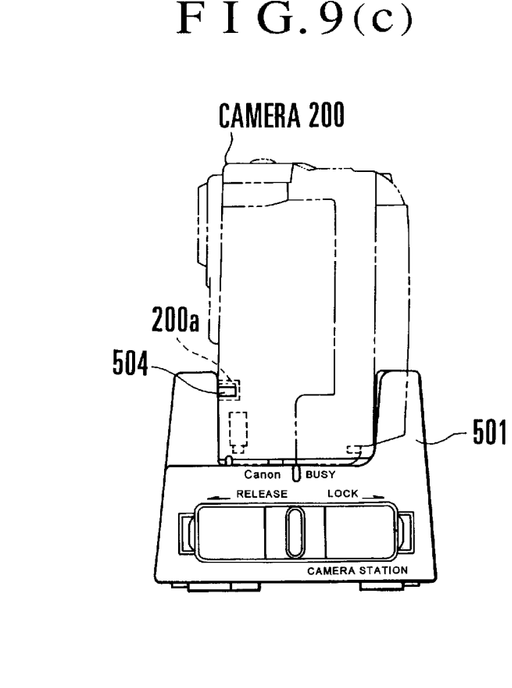
Figures 10A, 10B:
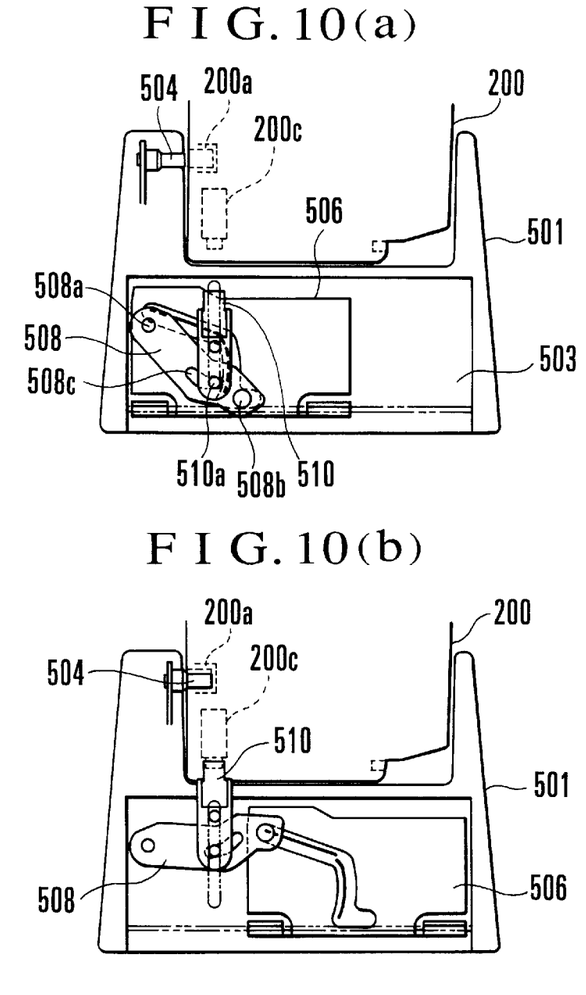
FIGS. 10(a) and 10(b) are side views showing the internal arrangement of the prototype of adapter device.

FIGS. 9(a) to 9(c) are appearance views of a proposed prototype of adapter device as viewed on its three different sides. FIGS. 10(a) and 10(b) are side views showing the internal arrangement of the adapter device shown in FIGS. 9(a) to 9(c).

Referring to FIGS. 9(a) to 9(c), with a camera 200 mounted on a body 501 of the adapter device in a predetermined position 501a, when an operation lever 502 is moved in a mounting direction, a lock member 504 which is provided for securing the camera 200 to the adapter device body 501 is first inserted into a lock hole 200a provided in the camera 200. Then, at the same time, a protection cover 505 is opened. When the operation lever 502 is moved further in the mounting direction, a cam plate 506 disposed in the inside 503 of the adapter device body 501 slides rightward as viewed on FIG. 10(a). The sliding motion of the cam plate 506 causes a lift arm 508 to swing counterclockwise on a shaft 508a by pushing a roller 508b upward. A slot 508c is provided in the lift arm 508. A connector 510 is provided with a shaft 510a which is inserted into the slot 508c. The connector 510 is moved upward according to the counterclockwise swing of the lift arm 508 and then inserted into a terminal 200c of the camera 200, as shown in FIG. 10(b).

The amount of ascent of the connector 510 in relation to the amount of movement of the operation lever 502 varies with the angle of inclination of the cam lift of the cam plate 506. The connector 510 quickly ascends if the angle of inclination of the cam lift is arranged to be steep, while the connector 510 slowly ascends if the angle of inclination of the cam lift is arranged to be moderate. In an "initial position", the connector 510 is buried within the adapter device body 501, as shown in FIG. 10(a). From the initial position, the connector 510 is swiftly moved upward with no load up to a "coupling start position" where the connector 510 begins to be coupled with the terminal 200c of the camera 200. After that, the connector 510 is preferably caused to slowly ascend up to a "coupling completed position", as some amount of force is required for inserting the connector 510 into the terminal 200c.

Figure 11:
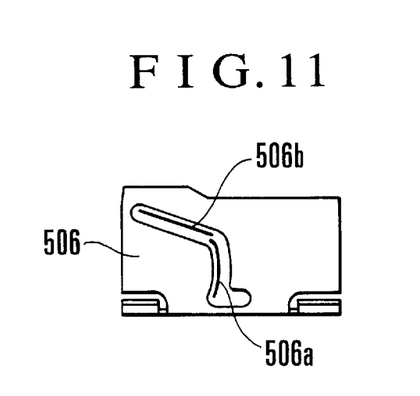
FIG. 11 is a front view showing a cam plate included in the prototype of adapter device.

In view of the above, as shown in FIG. 11, the angle of inclination of the cam lift of the cam plate 506 is arranged to be divided into two parts, i.e., a first cam lift part 506a which has a steep angle of inclination and a second cam lift part 506b which has a moderate angle of inclination. Thus, by effectively utilizing a limited operation range of the operation lever 502, it is possible to give the connector 510 a desirable operating condition.

However, the above prototype of adapter device has presented a shortcoming in the following point. That is, the adapter device has become incapable of fully coping with an increase in the inserting force for the connector 510. While, for peripheral equipment such as the digital electronic camera of the above kind, as mentioned above, it is necessary to provide a plurality of signal terminals, the number of signal terminals has increased for the purpose of improving functions of the peripheral equipment and the contact pressure of the signal terminals also has increased for the purpose of ensuring the reliability of terminal conduction. As a result, it has become necessary to increase the inserting force for the connector 510.

Roughly speaking, the increase of the inserting force for the connector 510 calls for improvement in the following three points.

(i) A first point lies in the insufficient strength of a lock mechanism part. The lock member 504 shown in FIGS. 9(a) to 9(c) is provided for preventing the camera 200 from buoying up when the connector 510 is inserted into the terminal 200c of the camera 200. However, the increase of the inserting force for the connector 510 naturally results in a larger force on the lock member 504. Specifically, the connector 510 has terminals widely aligned in the direction of a line X—X shown in FIG. 9(a). Therefore, the conventional arrangement of providing the lock member only at one position has caused the terminals to be in a poorly balanced state and thus has been hardly sufficient.

(ii) A second point lies in the possibility of having the connector 510 inadequately inserted. With the inserting force for the connector 510 increased, the deviation of the connector position taking place on the side of the camera 200 and the flexure or eccentricity due to play taking place at each mechanism part within the adapter device body 501 increase to cause a decrease in actual stroke of the connector 501. Under such a condition, the actual inserted position of the connector 501 fails to reach the "coupling completed position", thereby lowering the reliability of the conducting state of the signal terminals.

(iii) A third point lies in the flexure in pulling out the connector 510. The force of pulling out the connector 510 is about equal to the force of inserting the connector 510. The above-stated eccentricity due to play or flexure which takes place at the time of inserting the connector 510 naturally takes place in an about the same amount in the reverse direction in pulling out the connector 510. Then, the actual stroke of the connector 510 in pulling out the connector 510 also decreases. Under such a condition, the connector 510 might fail to be brought back to the "coupling start position" and thus might be left in a state of being incompletely pulled out.

Therefore, in the case of a design where the cam lift changes at the "coupling start position" from one angle of inclination over to another as shown in FIG. 11, at the time of pulling out the connector 510, the lift arm 508 comes to the first cam lift part 506a of the steep angle of inclination before the connector 510 is completely pulled out. Then, the operating force on the operation lever 502 suddenly comes to have a heavy load halfway in pulling out the connector 510. This trouble might be avoidable by setting the cam lift change-over point at a point located before the "coupling start position". Such a solution, however, necessitates the second cam lift part 506b to be arranged to have a steeper cam lift angle of inclination. Then, the steeper angle of inclination imposes a heavier load on the operating force on the operation lever 502 over the whole range of stroke both in inserting and pulling out the connector 510.

SUMMARY OF THE INVENTION

This invention is directed to the solution of the above-mentioned points to be improved.

It is, therefore, an object of this invention to provide an adapter system for peripheral equipment, an adapter device or a peripheral equipment, which is arranged to have an excellent operability for connecting the peripheral equipment and to permit efficient use of a space available on a desk top or on the surface of an installation stand.

It is another object of this invention to provide an adapter system for peripheral equipment, an adapter device or a peripheral equipment, which is arranged to have an excellent operability even against an increase in an inserting force for a connector without necessitating any increase over the size of the conventional mechanism.

To attain these objects, in accordance with an aspect of this invention, a camera system in which a camera is connected to a computer through an adapter device comprises the camera including a terminal arranged to externally output a signal and the adapter device including a body formed approximately in a rectangular parallelepiped shape, a connector arranged to be movable in such directions as to be inserted into and pulled out of the camera, an operation lever operable for connecting and detaching the camera to and from the adapter device, and a plurality of cams arranged to convert a motion of the operation lever into a reciprocating motion of the connector and to determine a ratio of an amount of movement of the connector to an amount of operation of the operation lever, the plurality of cams including a first cam arranged to determine a ratio of the amount of movement of the connector to the amount of operation of the operation lever from a movement start position of the connector to a coupling start position where the connector begins to be coupled with the terminal of the camera in mounting the camera on the adapter device, and a second cam arranged to determine a ratio of the amount of movement of the connector to the amount of operation of the operation lever from a coupling completed position where the connector is completely coupled with the terminal of the camera to a position beyond the coupling start position in demounting the camera from the adapter device, the ratio determined by the second cam being smaller than the ratio determined by the first cam.

To attain these objects, in accordance with another aspect of this invention, an adapter device for connecting a peripheral equipment to an electric apparatus to communicate information therebetween comprises a connector arranged to be movable in such directions as to be inserted into and pulled out of the peripheral equipment and arranged to be connected to a terminal of the peripheral equipment, an operation lever operable for moving the connector, and a plurality of cams arranged to convert a motion of the operation lever into a reciprocating motion of the connector and to determine a ratio of an amount of movement of the connector to an amount of operation of the operation lever, the plurality of cams including a first cam arranged to determine a ratio of the amount of movement of the connector to the amount of operation of the operation lever from a movement start position of the connector to a coupling start position where the connector begins to be coupled with the terminal of the peripheral equipment in mounting the peripheral equipment on the adapter device, and a second cam arranged to determine a ratio of the amount of movement of the connector to the amount of operation of. the operation lever from a coupling completed position where the connector is completely coupled with the terminal of the peripheral equipment to a position beyond the coupling start position in demounting the peripheral equipment from the adapter device, the ratio determined by the second cam being smaller than the ratio determined by the first cam.

To attain these objects, in accordance with a further aspect of this invention, an adapter device for connecting a peripheral equipment to an electric apparatus comprises a body formed approximately in a rectangular parallelepiped shape, a first connector disposed on an upper surface of the body and arranged for connection with the peripheral equipment, a second connector disposed on one side surface in a longitudinal direction of the body and arranged for connection with the electric apparatus, and an operation member disposed on another side surface in the longitudinal direction of the body and operable for connecting and detaching the peripheral equipment to and from the first connector.

These and other objects and features of this invention will become apparent from the following detailed description of an embodiment thereof taken in connection with the accompanying drawings.

BRIEF DESCRIPTION OF THE DRAWINGS

FIGS. 7A and 7B(a) to 7B(f) are side views showing the internal arrangement of the same adapter device.

DETAILED DESCRIPTION OF THE PREFERRED EMBODIMENT

Figure 1A:
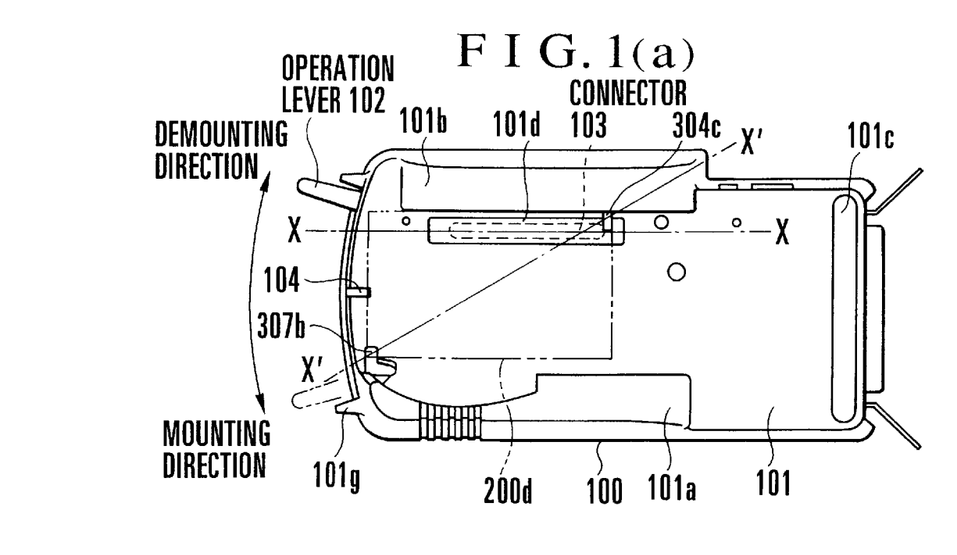
FIGS. 1(a) to 1(c) show the entirety of an adapter device according to an embodiment of this invention.
Figure 1B:
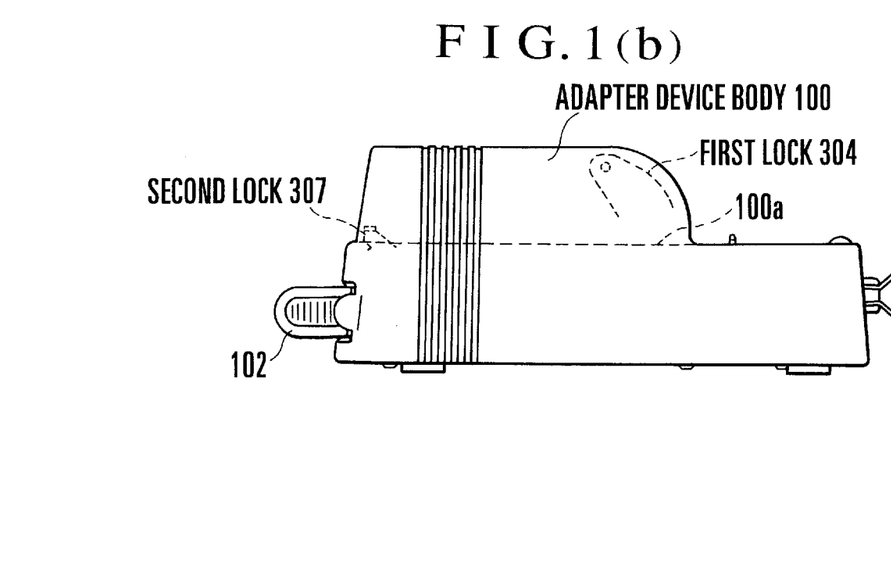
Figure 1C:
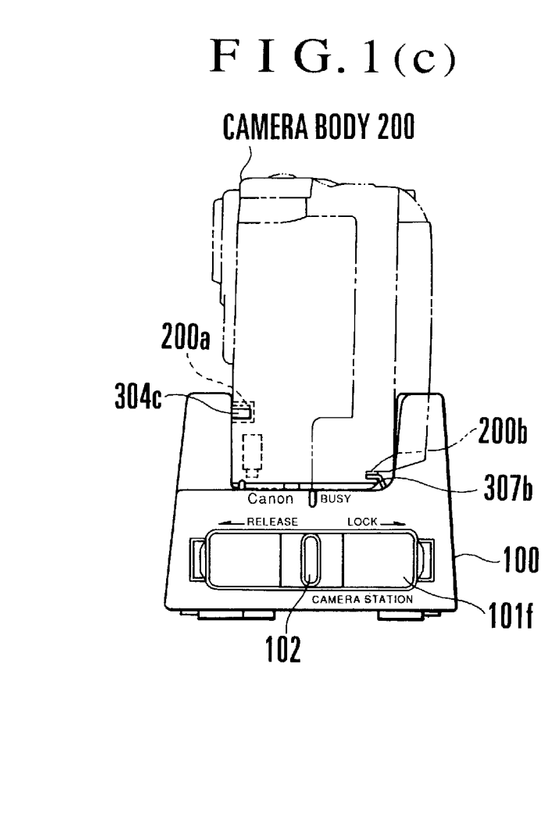
Figure 2:
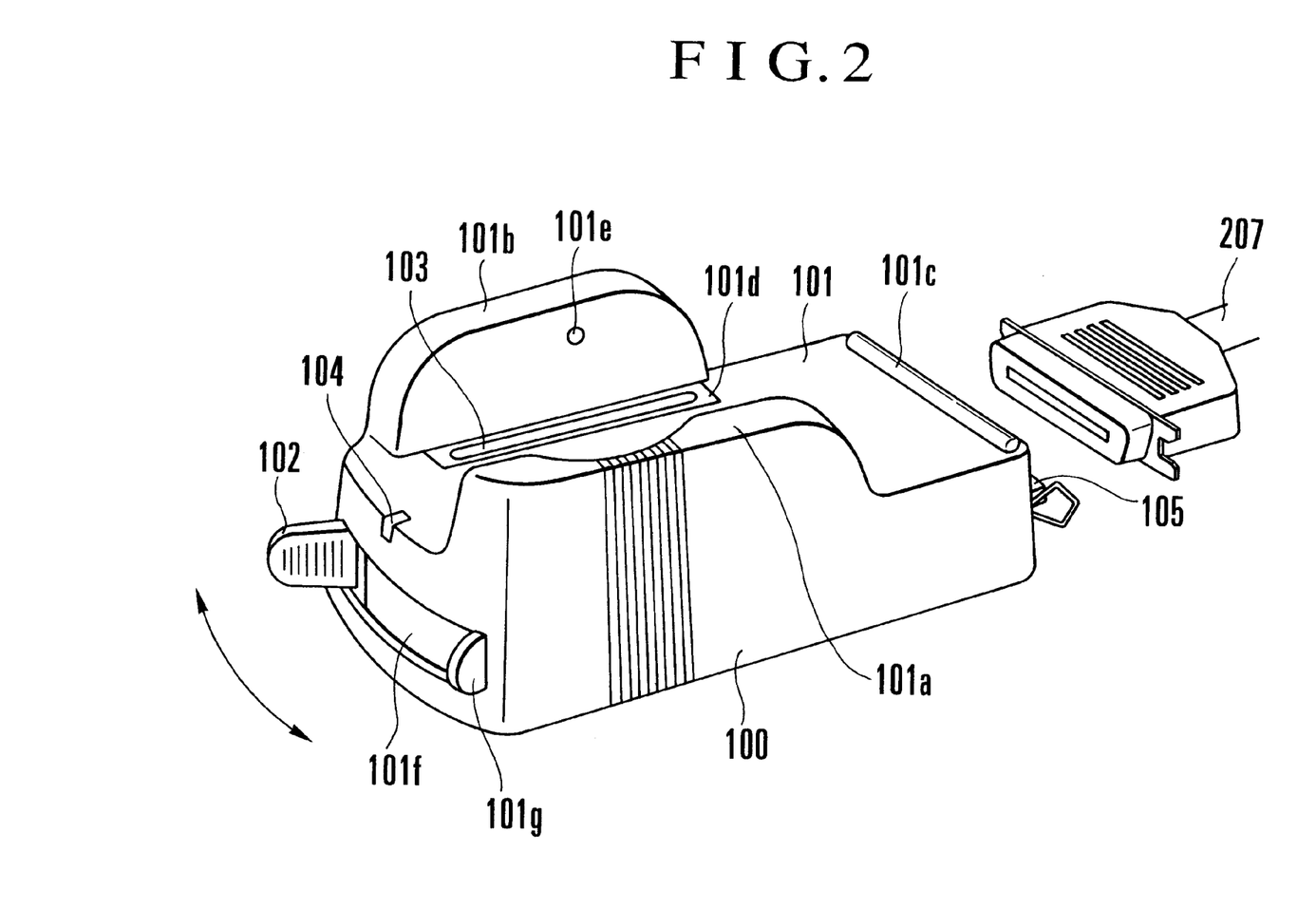
FIG. 2 is an oblique view showing in outline the entire arrangement of the same adapter device.

An embodiment of this invention is described as follows. FIGS. 1(a) to 1(c) show the entirety on three sides of an adapter device according to the embodiment of this invention. FIG. 2 is an oblique view showing the same adapter device according to the embodiment of this invention. In the following description, an electronic camera, i.e., a digital still camera, is taken up by way of example as a peripheral equipment. However, according to this invention, the peripheral equipment may be some other peripheral equipments that are generally known, such as a recording/reproducing device, a monitor device, a modem device, etc.

Referring to FIGS. 1(a) to 1(c) and FIG. 2, a body 100 of the adapter device is formed in an approximately rectangular parallelepiped shape. The adapter device body 100 is provided with a case 100. The case 100 has wall parts 101a and 101b arranged to guide and hold a body 200 of a camera when the camera is mounted on the adapter device, an R-shaped protruding part 101c arranged to receive the bottom of the camera body 200, an opening part 101d for a connector 103 (to be described later) arranged to electrically connect the camera to the adapter device, a hole 101e for a lock pin (to be described later) arranged to lock the camera body 200 when the camera is mounted on the adapter device, an opening part 101f for an operation lever 102 provided for connecting and detaching the camera to and from the adapter device, and a finger applying part 101g to which a finger can be applied in operating the operation lever 102.

The operation lever 102 is arranged to lock the camera body 200 and cause the connector 103 to be brought into electrical contact with the camera after the camera body 200 is placed on the adapter device body 100. The camera body 200 can be connected to and detached from the adapter device body 100 by sliding the operation lever 102 in the directions of arrows. In the case of this embodiment, after the camera body 200 is placed on the adapter device body 100, the camera body 200 can be coupled with the adapter device body 100 by sliding the operation lever 102 to the right from its left end position. The camera body 200 can be detached from the adapter device body 100 by sliding the operation lever 102 to the left from its right end position. In sliding the operation lever 102, the operation lever 102 can be easily operated to connect or detach the camera body 200 with one hand by pinching the finger applying part 101g and the operation lever 102 between a thumb and an index finger.

The connector 103 is an interface connector arranged to electrically connect the camera and the adapter device body 100. A connector of the same kind is also arranged on the side of the camera in a position corresponding to the position of the interface connector 103. With the interface connector 103 connected to the connector of the camera, an image signal, an audio signal, a control signal, etc., can be communicated between the camera and the adapter device body 100, and also electric power can be supplied from the adapter device body 100 to the camera. In the case of this embodiment, the interface connector 103 is arranged to move up or down relative to the camera to be connected to or detached from the connector on the side of the camera, in association with a sliding motion of the operation lever 102 in the direction of arrows.

A display LED 104 is arranged to light up while the camera is communicating with the adapter device body 100. A connector 105 for external connection is arranged to enable the adapter device to be connected to another electric apparatus such as a computer or the like. In the case of this embodiment, a Centronics® 36-pin female connector is employed as the external connector 105. A cable 207 is used for connecting the adapter device to the electric apparatus such as a computer or the like.

Figure 3:
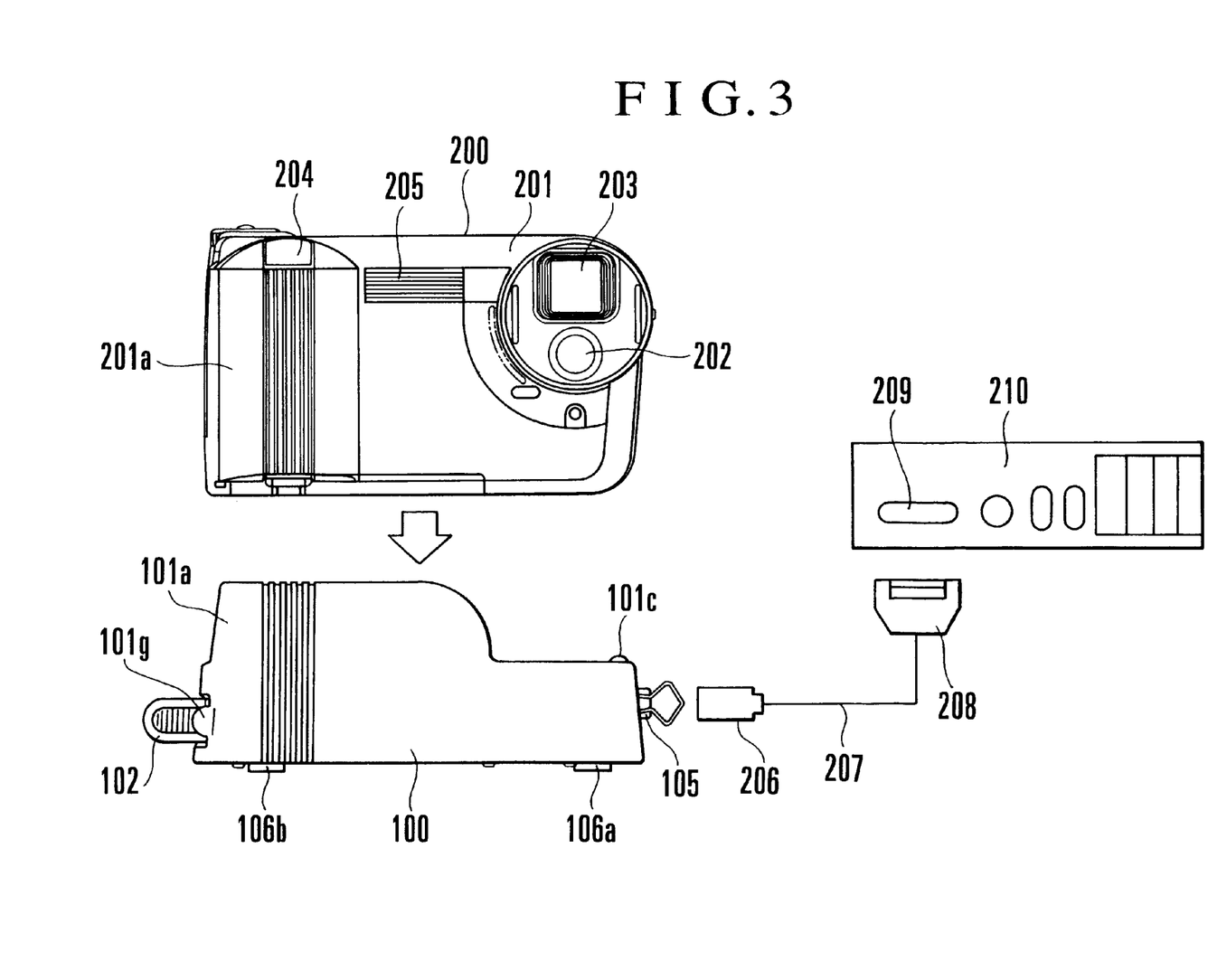
FIG. 3 shows how the same adapter device is connected to an image pickup apparatus and another electric apparatus.

FIG. 3 is a system diagram showing a connecting state among the adapter device body 100, the camera body 200, the cable 207 and a computer body 210. Referring to FIG. 3, the camera body 200 is set on the adapter device body 100 by moving the camera body 200 along the guide wall parts 101a and 101b. Then, the interface connector 103 shown in FIG. 1(a) is coupled with the connector of the camera body 200 by operating the operation lever 102. The camera body 200 has an exterior cover 201, which is provided with a grip part 201a. The camera includes a photo-taking lens 202, a viewfinder 203, and a release button 204. The release button 204 is arranged to be a two-step stroke switch, in which a first switch is turned on by a first stroke of the release button 204 to carry out preparatory actions for shooting, such as a light measuring action, a distance measuring action, etc., and a second switch is turned on by a second stroke of the release button 204 to carry out a shooting action. The camera is further provided with a flash device 205.

The cable 207 is, in the case of this embodiment, a printer cable which is normally used for connecting the computer to a printer. The cable 207 is provided with a Centronics® 36-pin male connector 206 which is to be connected to the external connection connector 105 of the adapter device body 100, and a connector 208 which is to be connected to the computer body 210. The connector 208 is available in varied types suited for computers of varied types.

Rubber leg pieces 106a and 106b are disposed on the bottom surface of the adapter device body 100 for preventing slippage and damages. A cable such as the cable 207 generally measures about 2 m and has a certain amount of weight. Therefore, without such antislipping pieces as the rubber pieces 106a and 106b, the adapter device body 100 might happen to be dragged to drop off a desk top or the like by the weight of the cable.

In FIG. 3, the computer body 210 is illustrated to show the arrangement on the rear side thereof. In the case of this embodiment, the computer 210 is connected by means of a printer connecting connector 209.

Figure 4:
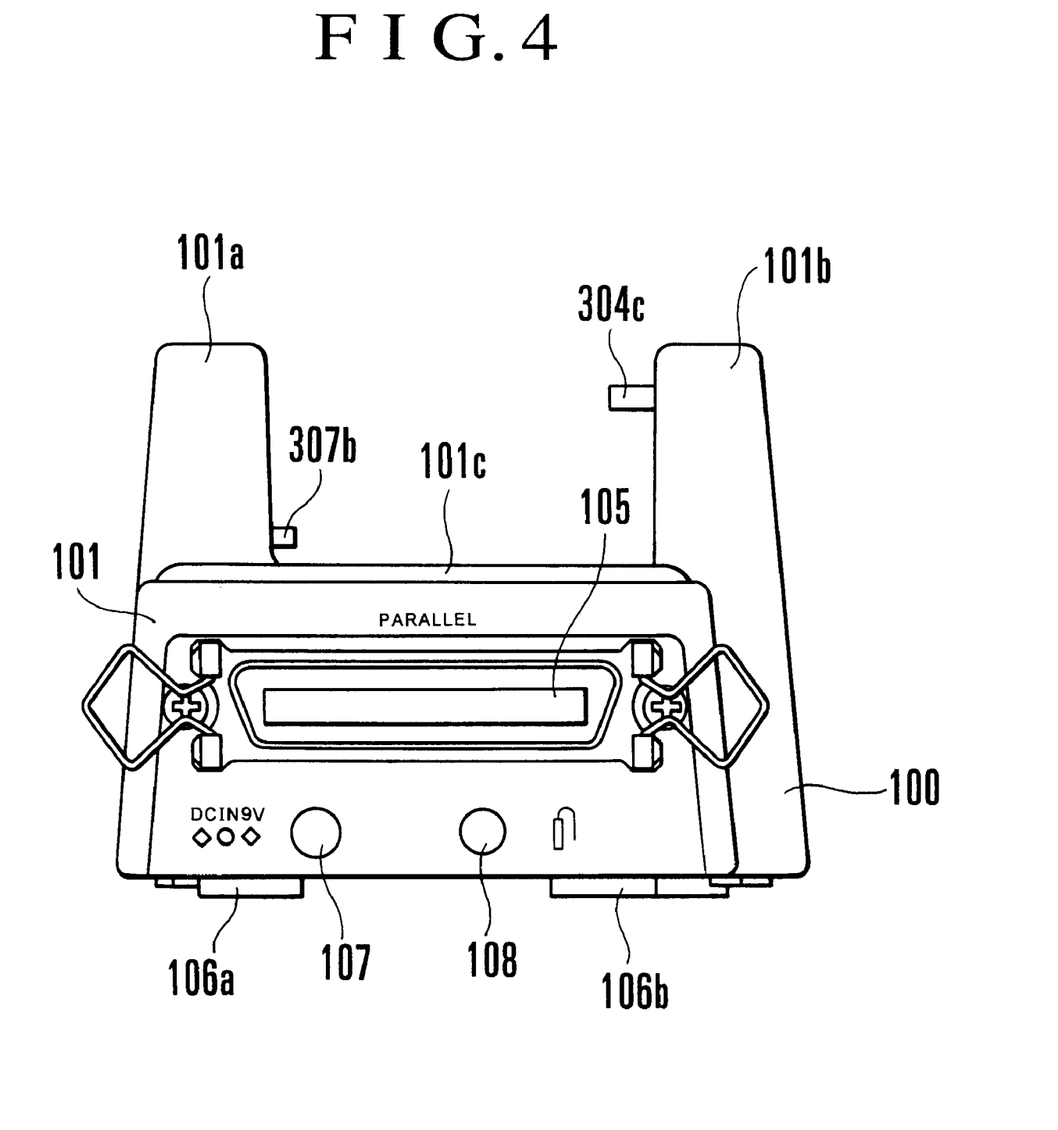
FIG. 4 is a rear view of the same adapter device showing one side thereof where a connector is disposed for connection with an electric apparatus.

FIG. 4 shows the arrangement on one end side of the adapter device body 100 where the connector 105 for external connection is disposed. In addition to the external connection connector 105, there are provided a power input terminal 107 and a terminal 108 for a remote operation cable on this side.

An AC adapter or the like is arranged to be connectable to the power input terminal 107 to supply electric power to the adapter device body 100 and also to the camera body 200 through the adapter device body 100. In a case where a rechargeable battery is placed in the camera body 200, the power input terminal 107 allows the rechargeable battery to be charged. Therefore, the adapter device body 100 functions as a battery charger when the camera body 200 is left in connection with the adapter device body 100 while the camera is not in use.

A shutter release can be made through a remote operation cable if the remote operation cable is connected to the remote operation cable terminal 108, so that the adapter device body 100 can be used as a desk-top tripod.

There are provided lock pins 304c and 307b for fixing the camera body 200 in position. The lock pin 304c is normally stowed in the wall part 101b of the adapter device body 100. The other lock pin 307b is normally stowed in the other wall part 101a of the adapter device body 100. When the operation lever 102 is caused to slide to connect the camera body 200, the lock pins 304c and 307b protrude, as shown in FIG. 4, to fix the camera body 200 by coming into corresponding recessed parts 200a and 200b formed in the camera body 200. The camera body 200 is thus effectively prevented from accidentally slipping off the adapter device body 100. Further, when the interface connector 103 is inserted into the corresponding connector of the camera body 200, the lock pins 304c and 307b also serve to prevent the camera body 200 from being buoyed up by its inserting force.

Figure 5:
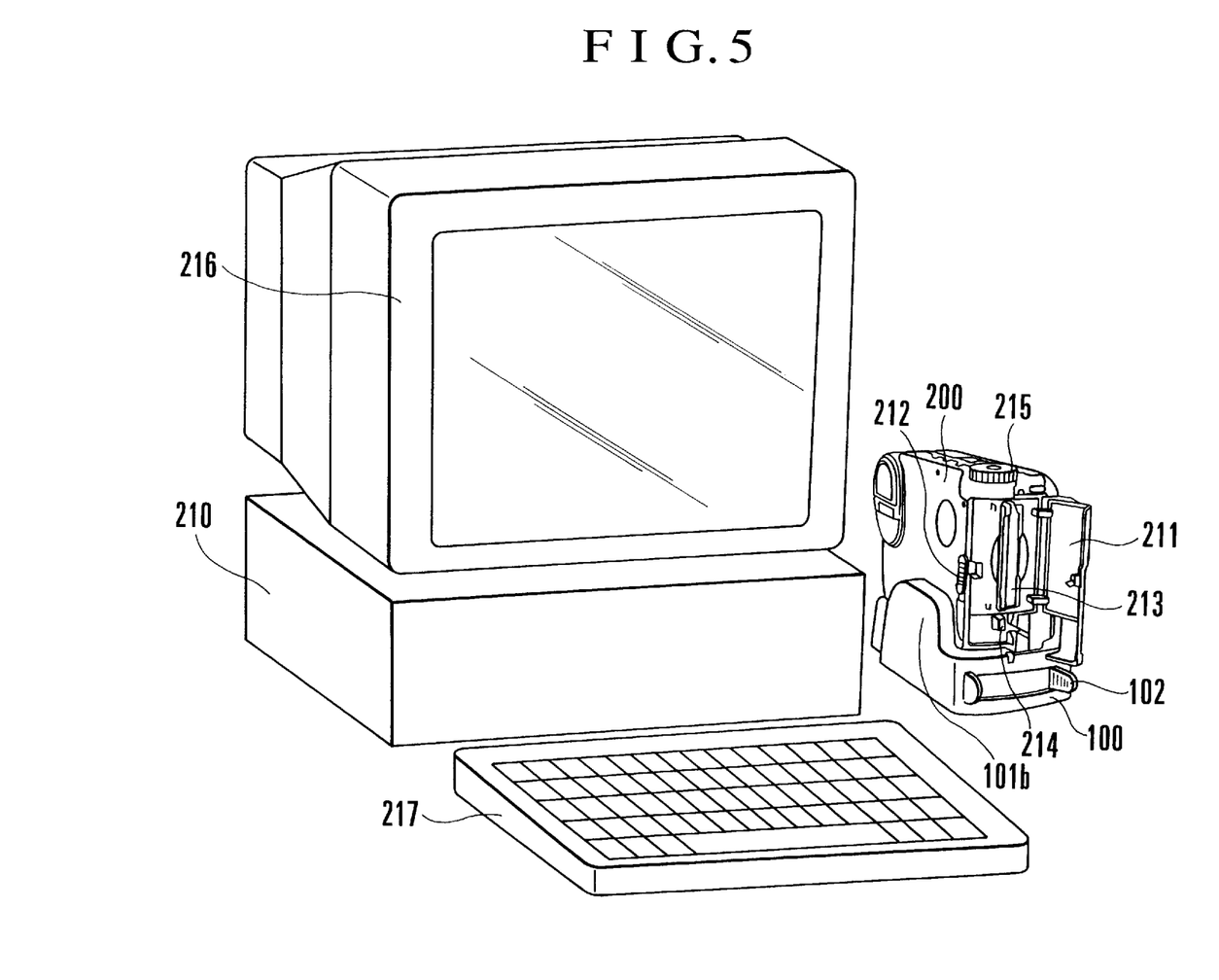
FIG. 5 is an oblique view showing an example in which the adapter device on which an image pickup apparatus is mounted is placed in the neighborhood of an electric apparatus.

FIG. 5 shows by way of example a case where a camera and a computer are arranged for the adapter device body 100. In the case of a digital still camera, the camera is often connected to a computer and is placed in the neighborhood of the computer. In the case of FIG. 5, a monitor 216 is placed on the computer body 210 and a keyboard 217 is placed in front of the computer body 210.

The adapter device body 100 is placed on one side of the computer body 210 with the operation lever 102 on the front side of the adapter device body 100. The external connection connector 105 is located on the rear side of the adapter device body 100 and is connected by means of the cable 207 to the connector 209 of the computer body 210 at the respective rear sides of the adapter device body 100 and the computer body 210, since the connector 209 is located also on the rear side of the computer body 210. The cable 207, therefore, never comes to the front side, so that a necessary desk-top space can be easily secured for a mouse, etc., on the front side of the system.

Referring to FIG. 5, an opening/closing lid 211 is arranged to open and close a replacing part where a recording medium such as a PCMCIA memory card or the like is to be replaced. The opening/closing lid 211 can be opened by sliding down a lever 212. The wall part 101b of the adapter device body 100 is formed in such a shape that the wall part 101b never interferes with the motion of the lever 212.

The camera body 200 is provided with an opening part 213 for insertion and removal of a recording medium. In the case of this embodiment, the camera is arranged to permit use of a PCMCIA memory card. An ejection button 214 is arranged to permit ejection of the memory card. The memory card can be taken out by pushing the ejection button 214.

A mode selection dial 215 is arranged to permit changeover of one shooting mode of the camera over to another by turning the dial 215.

In the case of FIG. 5, the adapter device is set on one side of a computer. However, in many cases, some peripheral equipment such as a printer or a memory drive or the like is arranged also around a computer. In such a case, the adapter device is easily set between the computer and the peripheral equipment as it can be set in a state of having a narrow width.

Further, since the operation lever 102 is located on the front side of the adapter device body 100, the camera body 200 can be mounted and demounted on and from the adapter device body 100 without moving the adapter device body 100.

In the case of this embodiment, the recording medium is arranged to be mounted or demounted on and from the camera body 200 on the same side as the side where the operation lever 102 is disposed on the adapter device body 100. Therefore, the recording medium can be replaced in the state of having the camera body 200 coupled with the adapter device body 100 without changing their positions.

As described above, in the embodiment, the camera and the adapter device are arranged to have a small width in setting them. In setting the adapter device, the operation member (lever) which must be operated in connecting the camera is disposed on the front side while the connector which is to be used for connecting a cable is disposed on the rear side of the adapter device body.

The side of the adapter device body 100 on which the operation member (lever) is arranged is on the same side of the system as the recording medium mounting/demounting side of the camera body.

The adapter device of this embodiment includes connection means for electrical connection, such as a connector, contacts, etc., and arranged to input and output control signals and image and audio signals to and from an image pickup apparatus and to be connectable to an electric apparatus such as a computer, a TV monitor, or the like.

Next, the details of the arrangement of the adapter device and its operation according to the embodiment of this invention are described as follows.

Figure 6A:
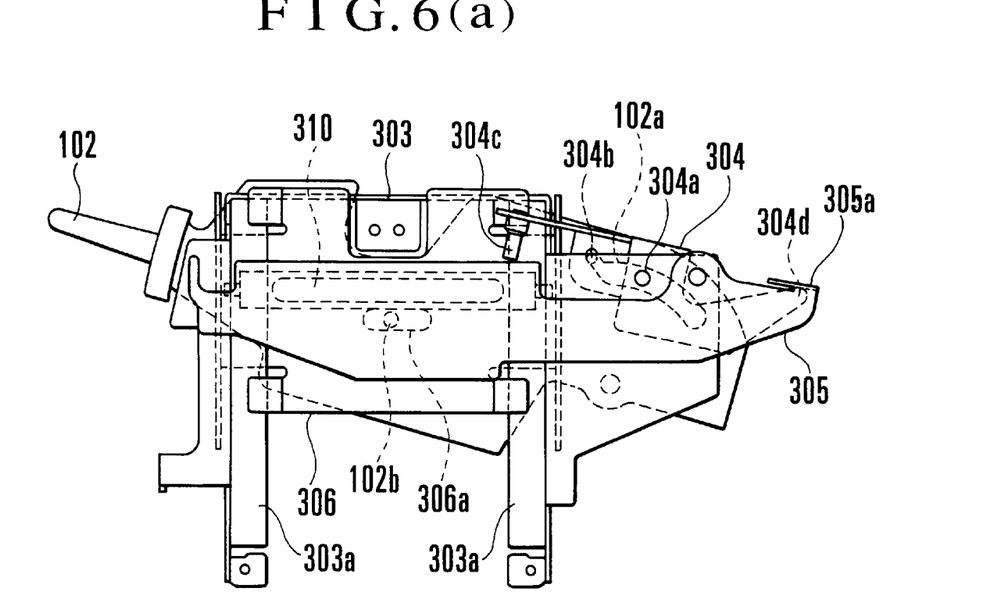
FIGS. 6(a) and 6(b) are top views respectively showing the internal arrangement of the same adapter device.
Figure 6B:
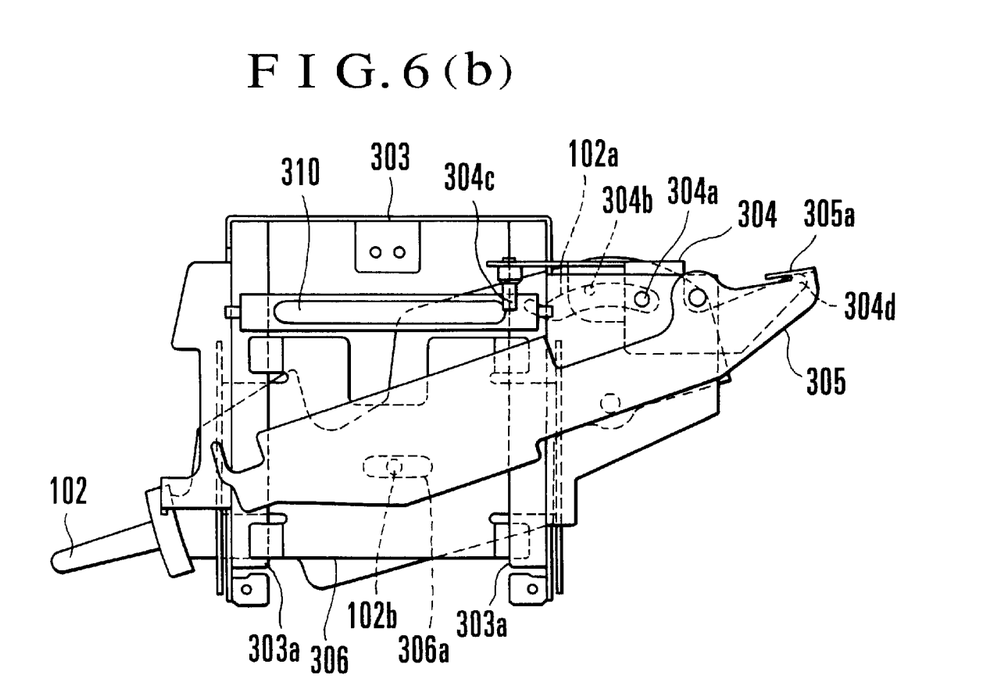

FIGS. 6(a) and 6(b) show the internal arrangement of the adapter device as viewed from above.

Figure 7A:
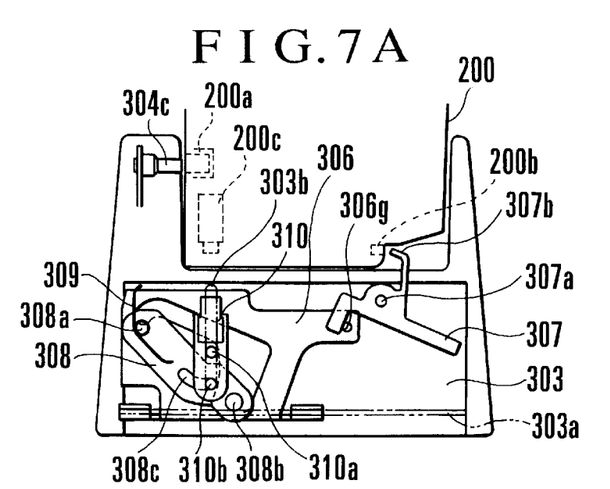
Figure 7B:
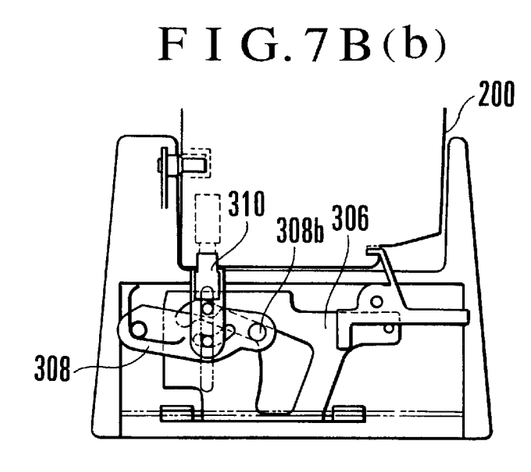

FIG. 7(A) shows the internal arrangement of the adapter device as viewed from one side.

In FIGS. 1(a) to 1(c) and FIG. 2, reference numeral 100a denotes a predetermined position at which the camera is to be placed on the adapter device body 100. The whole internal mechanism of the adapter device body 100 is arranged to be operated according to the motion of the operation lever 102.

FIG. 6(a) shows the adapter device in an initial state and FIG. 6(b) shows the adapter device in an operating state. Referring to FIGS. 6(a) and 6(b), the whole internal mechanism is supported by a chassis 303. A first lock 304 is arranged to be swingable on a lock shaft 304a. A pin 304b on the first lock 304 is engaged in a cam hole 102a of the operation lever 102. The first lock 304 swings according to the motion of the operation lever 102. Then, the lock pin 304c on the first lock 304 comes into or out of the lock hole 200a provided in the camera body 200. A protection cover 305 is arranged to be opened and closed by being moved in association with the motion of the first lock 304 through a bent-up part 305a which abuts on an arm part 304d of the first lock 304.

Figure 8:
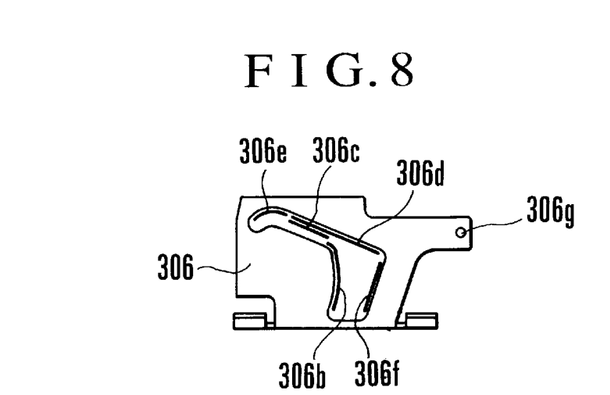
FIG. 8 is a front view showing a cam plate included in the same adapter device.

A pin 102b of the operation lever 102 is fitted into a hole 306a which is formed in a cam plate 306. The cam plate 306 is thus arranged to horizontally slide by the pin 102b while being guided along guide parts 303a of the chassis 303. As shown in FIG. 8, the cam plate 306 is provided with a cam hole which is composed of a first cam lift part 306b, a second cam lift part 306d, a third cam lift part 306c and an overcharge mechanism part 306e.

Referring to FIG. 7A, a second lock 307 is arranged to be swingable on a shaft 307a and to be pushed to swing by a pin 306g of the cam plate 306 according to the sliding motion of the cam plate 306. The lock claw 307b formed at the fore end of the second lock 307 then comes into or out of the lock hole 200b provided in the camera body 200. A lift arm 308 is swingable on a shaft 308a and is thus arranged to swing abutting on the cam lift parts 306b to 306e of the cam plate 306 through a roller 308b according to the sliding motion of the cam plate 306. A slot 308c is formed in the lift arm 308. A lift arm spring 309 is arranged to constantly urge the lift arm 308 to swing clockwise. A connector 310 having a plurality of signal terminals is provided with a first shaft 310a and a second shaft 310b, which are fitted into a slide hole 303b of the chassis 303. The second shaft 310b is fitted further into the slot 308c of the lift arm 308. The connector 310 is thus arranged to be slidden up and down into or out of a terminal 200c of the camera body 200 according to the swinging motion of the lift arm 308.

With the adapter device arranged as described above, the adapter device operates as described below in mounting and demounting the camera thereon and therefrom. Further, FIGS. 7B(a) to 7B(f) show how the state of FIG. 7A varies while the adapter device is in operation.

The camera body 200 is first placed on the adapter device body 100 as shown in the front view of FIG. 1(c). The position of the operation lever 102 is then at an end part in the direction of demounting the camera body 200. When the operation lever 102 is moved in the mounting direction, the cam hole 102a of the operation lever 102 causes the first lock 304 to swing counterclockwise through the pin 304b. Then, the lock pin 304c comes to engage the lock hole 200a of the camera body 200. Further, t he arm part 304d of the first lock 304 pushes the bent-up part 305a of the protection cover 305 to open the protection cover 305, as show n in FIGS. 6(a) and 6(b). Since the operation lever 102 causes through the pin 102b the cam plate 306 to slide horizontally, the pin 306g of the cam plate 306 pushes the second lock 307 to cause the second lock 307 to swing counterclockwise. The lock claw 307b of the second lock 307 then comes to engage the lock hole 200b provided in the camera body 200, as shown in FIG. 7B(a).

Referring to FIG. 1(a), the positional relation of the connector 103 to the two lock mechanisms is as follows. The lock pin 304c is located on the side of one end of the alignment of signal terminals of the connector 103 on a line X—X and the lock claw 307b is located on the side of the other end. The lock pin 304c and the lock claw 307b are inserted into the camera body 200 from two directions opposite to each other across the line X—X. As a result, a line connecting the two lock mechanisms forms a diagonal line X'—X' on the bottom face 200d of the camera body 200 including the position of the connector 103, as shown in FIG. 1(a). The bottom face 200d is brought into tight contact with the adapter device body 100 at a predetermined position 100a along the diagonal line X'—X', so that the camera body 200 can be stably mounted on the adapter device body 100.

Meanwhile, the cam plate 306 horizontally slides to cause the first cam lift part 306b to abut on the roller 308b of the lift arm 308, as shown in FIG. 7B(a). Then, with the operation lever 102 being moved further in the mounting direction, the cam plate 306 causes the lift arm 308 to swing counterclockwise against the urging force of the lift arm spring 309. The lift arm 308 then causes the connector 103 which has been in an "initial position" to slide via the second shaft 310b which is fitted in the slot 308c of the lift arm 308. The connector 103 is thus caused to ascend up to a "coupling start position" where the connector 103 begins to be coupled with the terminal 200c of the camera body 200, as shown in FIG. 7B(b).

The connector 103 then can be inserted into the terminal 200c without resistance from the "initial position" up to the "coupling start position", with the exception of a slight resistance caused by the urging force of the lift arm spring 309. Therefore, in order to have the connector 103 to promptly ascend, the first cam lift part 306b of the cam plate 306 is arranged to have a steep angle of inclination, and the lift arm 308 is arranged to have a large amount of swinging in relation to the amount of sliding of the cam plate 306.

After arrival at the "coupling start position", the connector 103 begins to be inserted into the terminal 200c of the camera body 200. Then, when the operation lever 102 causes the cam plate 306 to slide still further in the horizontal direction, the third cam lift part 306c causes the connector 103 to ascend up to a "coupling completed position" by pushing up the roller 308b of the lift arm 308. Taking some resistance to the insertion of the connector 103 into consideration, the third cam lift part 306c is arranged to have a more moderate angle of inclination than that of the first cam lift part 306b, as shown in FIG. 8, so that the operation lever 102 can be smoothly operated.

However, in actuality, the measured value of the resistance to the connector insertion is about 5 or 6 kg in the case of the adapter device of this embodiment. This amount of resistance causes a considerable amount of flexure or play eccentricity at each of mechanism parts on the side of the camera and within the adapter device. As a result, the actual stroke of the connector 103 becomes shorter than a stroke designed. Therefore, when the connector 103 is supposed to have reached the "coupling completed position", the connector 103 has not yet been sufficiently inserted into the signal terminal 200c (see FIG. 7B(c)).

To solve this problem, the cam plate 306 is caused to horizontally slide still further, temporarily beyond the "coupling completed position", to have the roller 308b pushed upward by the overcharge mechanism part 306e of the cam hole to an extent corresponding to the above-stated flexure or play eccentricity. The connector 103 thus can be inserted sufficiently into the signal terminal 200c, as shown in FIG. 7B(d). After the overcharging process, the connector 103 is brought back to the "coupling completed position" to relieve each of the mechanisms on the side of the camera body 200 and within the adapter device body 100 from the flexure or play eccentricity, as shown in FIG. 7B(e). At this moment, the operation lever 102 reaches its operation end part in the mounting direction. Further, in the case of this embodiment, the third cam lift part 306c and the first half of the overcharge mechanism part 306e are arranged to have the same angle of inclination, so that the operation lever 102 can be smoothly operated when the roller 308b shifts between these parts.

In demounting the camera from the adapter device, after completion of the camera mounting operation, the embodiment operates in the following manner.

When the operation lever 102 is moved in the demounting direction, the cam plate 306 moves to the left. The overcharge mechanism part 306e of the cam hole then pushes up the roller 308b of the lift arm 308 to cause the connector 103 to temporarily move further upward from the "coupling completed position", as shown in FIG. 7B(d). The amount of this temporary upward motion is absorbed by the flexure or play eccentricity of each of the mechanisms located on the side of the camera and within the adapter device to give an adequate click feeling on the operation lever 102. When the operation lever 102 is moved further, the connector 103 descends back to the "coupling completed position" to cancel the flexure and play eccentricity, as shown in FIG. 7B(c).

After the above-stated process, the operation shifts to a process of pulling out the connector 103. With the operation lever 102 being continuously moved in the demounting direction, the second cam lift part 306d of the cam hole pushes down the roller 308b of the lift arm 308 to cause the connector 103 to descend from the "coupling completed position" toward the "coupling start position". However, since the connector pulling-out force is about equal to the connector inserting force as mentioned in the foregoing, the flexure and play eccentricity which take place in inserting the connector also take place to about the same degree in pulling out the connector. The actual connector moving stroke, therefore, is shorter also in the case of pulling out the connector 103. Therefore, when the connector 103 is supposed to have been brought back to the "coupling start position", the connector 103 has not yet been sufficiently pulled out from the camera (see FIG. 7B(b)).

Therefore, an action of completely pulling out the connector 103 from the signal terminal 200c of the camera body 200 is carried out by shifting the process of tracing the same cam locus as in the case of inserting the connector to a process of using a cam lift which differs from the cam lift used in inserting the connector. While the operation lever 102 is in process of being moved to its end position in the demounting direction, the second cam lift part 306d (see FIG. 8) pushes down the roller 308b of the lift arm 308 to cause the connector 103 to move down to an extent corresponding to a negative amount resulting from the flexure and play eccentricity, as shown in FIG. 7B(f). Like the third cam lift part 306c, the second cam lift part 306d is arranged to have an angle of inclination which is more moderate than the first cam lift part 306b, with some resistance to the action of pulling out the connector 103 taken into consideration.

Further, in the case of this embodiment, the angle of inclination of the third cam lift part 306c and that of the second cam lift part 306d are arranged to be the same, so that the operation lever 102 can be smoothly operated when the position of the roller 308b shifts between these parts.

The connector 103 which is in the incompletely moved state can be completely pulled out by virtue of the second cam lift part 306d with the operation lever 102 moved to its end position in the demounting direction. Then, any resistance to the pulling-out action disappears. The lift arm 308 is automatically caused by the urging force of the lift arm spring 309 to swing clockwise by the roller 308b moving within a space part of the cam hole without abutting on a wall surface 306f of the cam hole, thereby bringing the connector 103 back to the "initial position", as shown in FIG. 7A.

The adapter device is used in most cases by setting it on a flat surface such as a desk top or the like. However, even if the adapter device is used, for example, in a posture of being held by using a tripod hole provided in its rear side, the connector 103 can be reliably brought back to the "initial position" by virtue of the urging force of the lift arm spring 309 without being affected by the posture difference with respect to the direction of gravity.

In the embodiment described above, the adapter device for peripheral equipment is provided with two lock mechanism parts for securing a peripheral equipment to the adapter device. The two lock mechanism parts are arranged in such a way as to form a diagonal line over a peripheral equipment mounting plane including a range within which the connector is located on the adapter device. When the peripheral equipment is mounted on the adapter device, the whole bottom face of the peripheral equipment comes into tight contact with the adapter device along the diagonal line connecting the two lock mechanism parts. This mounting arrangement ensures a stable relation in mounting position between the peripheral equipment and the adapter device even in cases where a connector requires a larger inserting force than an inserting force conventionally used.

The cam shape of the cam member which converts the motion of the operation lever into an inserting or pulling-out action on the connector is formed to include first and third cam lift parts which are used for inserting the connector into a terminal and a second cam lift part which is to be used in pulling out the connector. At the first cam lift part, the connector can be inserted at a relatively high speed from the "initial position" to the "coupling start position". At the third cam lift part, the connector is inserted from the "coupling start position" to the "coupling completed position" at a speed which is slower than at the first cam lift part. In pulling out the connector, the connector is moved from the "coupling completed position" back to a position beyond the "coupling start position" by the second cam lift part at a speed slower than the first cam lift part. These cam lift parts are set by taking into consideration positional deviations and differences possibly brought about between the inserting and pulling-out processes by flexure and play eccentricity taking place when the peripheral equipment is mounted on the adapter device. By virtue of the cam lift arrangement, the operation lever of the adapter device can be smoothly operated without causing any disagreeable feeling in operating the operation lever even in a case where a connector in use requires a large inserting force.

Another advantage of the adapter device of the embodiment lies in that the connector is arranged to be overcharged after the end of the third cam lift part. The overcharging arrangement ensures that the connector is reliably inserted further even when the connector happens to be inadequately inserted at the end of the third cam lift part due to flexure or play eccentricity taking place when the peripheral equipment is mounted on the adapter device.

A further advantage of the adapter device of the embodiment lies in that, in pulling out the connector, the connector is arranged to be brought back from the "coupling start position" to the "initial position" by a spring force with the roller of the lift arm moving within a space part of the cam hole without abutting on the wall surface of the cam hole. Therefore, when the peripheral equipment is demounted from the adapter device, the connector is forcibly caused to come back to the "initial position" by the spring force, so that the connector can be reliably brought back to the "initial position" without being affected by any difference in posture with respect to the direction of gravity.

What is claimed is:

1. A camera system in which a camera is connected to a computer through an adapter device, comprising:
    said camera including a terminal arranged to externally output a signal; and
    said adapter device including:
        (a) a body formed approximately in a rectangular parallelepiped shape;
        (b) a connector arranged to be movable in such directions as to be inserted into and pulled out of said camera;
        (c) an operation lever operable for connecting and detaching said camera to and from said adapter device; and
        (d) a plurality of cams arranged to convert a motion of said operation lever into a reciprocating motion of said connector and to determine a ratio of an amount of movement of said connector to an amount of operation of said operation lever, said plurality of cams including:
            (I) a first cam arranged to determine a ratio of the amount of movement of said connector to the amount of operation of said operation lever from a movement start position of said connector to a coupling start position where said connector begins to be coupled with said terminal of said camera in mounting said camera on said adapter device; and
            (II) a second cam arranged to determine a ratio of the amount of movement of said connector to the amount of operation of said operation lever from a coupling completed position where said connector is completely coupled with said terminal of said camera to a position beyond the coupling start position in demounting said camera from said adapter device, the ratio determined by said second cam being smaller than the ratio determined by said first cam.

2. A camera system according to claim 1, wherein said adapter device includes first and second lock mechanism parts arranged to cause said camera to be fixed to and detached from said adapter device in association with an operation of said operation lever.

3. A camera system according to claim 2, wherein said first and second lock mechanism parts include pin members arranged to protrude according to the operation of said operation lever.

4. A camera system according to claim 3, wherein said camera is provided with hole parts arranged to fit on said pin members.

5. A camera system according to claim 1, wherein said plurality of cams of said adapter device further include a third cam arranged to determine a ratio of the amount of movement of said connector to the amount of operation of said operation lever from the coupling start position where said connector begins to be coupled with said terminal of said camera to the coupling completed position in mounting said camera on said adapter device, the ratio determined by said third cam being smaller than the ratio determined by said first cam.

6. A camera system according to claim 5, wherein said adapter device is provided with a space part arranged to make larger than the ratio determined by said second cam a ratio of the amount of movement of said connector to the amount of operation of said operation lever from the position beyond the coupling start position where said connector begins to be coupled with said terminal of said camera to the movement start position in demounting said camera from said adapter device.

7. A camera system according to claim 6, wherein said plurality of cams of said adapter device further include an overcharge mechanism arranged to overcharge said connector in a direction to couple said connector with said terminal of said camera after completion of the movement of said connector along said third cam and then to bring said connector back to the coupling completed position, in mounting said camera on said adapter device.

8. A camera system according to claim 7, wherein said overcharge mechanism is arranged to move said connector from the coupling completed position in such a way as to overcharge said connector in the direction to couple said connector with said terminal of said camera and then to pull out said connector from said terminal of said camera along said second cam, in demounting said camera from said adapter device.

9. A camera system according to claim 1, wherein said body of said adapter device formed approximately in a rectangular parallelepiped shape is provided with holding members which are arranged to hold said camera and which are disposed at end parts of an upper surface of said body in a longitudinal direction thereof.

10. A camera system according to claim 1, wherein said adapter device is used for transmission of an image signal between said camera and said computer.

11. A camera system according to claim 10, wherein said adapter device includes indication means for providing an indication that the image signal is being communicated, when the image signal is being transmitted from said camera to said computer.

12. A camera system according to claim 1, wherein said camera has an opening part for loading and unloading an interchangeable recording medium, and wherein one side of said camera in which said opening part is formed is located on the same side as one side of said adapter device on which said operation lever is disposed.

13. A camera system according to claim 9, wherein said camera has an opening part for loading and unloading an interchangeable recording medium, and wherein one side of said camera in which said opening part is formed is located on the same side as one side of said adapter device on which said operation lever is disposed.

14. A camera system according to claim 13, wherein said camera has an opening/closing member which is provided for opening and closing said opening part and which is disposed on the same plane as one of said holding members, and wherein said one of said holding members is formed in such a shape as not to interfere with an operation of said opening/closing member.

15. A camera system according to claim 1, wherein said adapter device includes a power input terminal.

16. A camera system according to claim 15, wherein said adapter device includes a battery charger.

17. A camera system according to claim 15, wherein said adapter device includes a remote operation terminal for connection with a remote operation device used to perform a remote operation of said camera.

18. A camera system according to claim 1, wherein said camera is a digital still camera which digitally records a still image on a recording medium.

19. A camera system according to claim 18, wherein said recording medium is a PCMCIA memory card.

20. A camera defined by a camera system according to claim 1.

21. An adapter device for connecting a peripheral equipment to an electric apparatus to communicate information therebetween, comprising:
(a) a connector arranged to be movable in such directions as to be inserted into and pulled out of said peripheral equipment, and arranged to be connected to a terminal of said peripheral equipment;
(b) an operation lever operable for moving said connector; and
(c) a plurality of cams arranged to convert a motion of said operation lever into a reciprocating motion of said connector and to determine a ratio of an amount of movement of said connector to an amount of operation of said operation lever, said plurality of cams including:
(I) a first cam arranged to determine a ratio of the amount of movement of said connector to the amount of operation of said operation lever from a movement start position of said connector to a coupling start position where said connector begins to be coupled with said terminal of said peripheral equipment in mounting said peripheral equipment on said adapter device; and
(II) a second cam arranged to determine a ratio of the amount of movement of said connector to the amount of operation of said operation lever from a coupling completed position where said connector is completely coupled with said terminal of said peripheral equipment to a position beyond the coupling start position in demounting said peripheral equipment from said adapter device, the ratio determined by said second cam being smaller than the ratio determined by said first cam.

22. An adapter device according to claim 21, wherein said plurality of cams further include a third cam arranged to determine a ratio of the amount of movement of said connector to the amount of operation of said operation lever from the coupling start position where said connector begins to be coupled with said terminal of said peripheral equipment to the coupling completed position in mounting said peripheral equipment on said adapter device, the ratio determined by said third cam being smaller than the ratio determined by said first cam.

23. A peripheral equipment adapted to be connected to an adapter device according to claim 21, said peripheral equipment having the terminal to be connected to said connector.

24. An adapter device according to claim 21, further comprising first and second lock mechanism parts arranged to cause said peripheral equipment to be fixed to and detached from said adapter device in association with an operation of said operation lever.

25. An adapter device according to claim 24, wherein said first and second lock mechanism parts include pin members diagonally arranged on a surface of said adapter device on which said peripheral equipment is mounted and which includes a range within which said connector is located.

26. An adapter device according to claim 22, wherein said adapter device is provided with a space part arranged to make larger than the ratio determined by said second cam a ratio of the amount of movement of said connector to the amount of operation of said operation lever from the position beyond the coupling start position where said connector begins to be coupled with said terminal of said peripheral equipment to the movement start position in demounting said peripheral equipment from said adapter device.

27. An adapter device according to claim 26, wherein said plurality of cams further include an overcharge mechanism arranged to overcharge said connector in a direction to couple said connector with said terminal of said peripheral equipment after completion of the movement of said connector along said third cam and then to bring said connector back to the coupling completed position, in mounting said peripheral equipment on said adapter device.

28. An adapter device according to claim 27, wherein said overcharge mechanism is arranged to move said connector from the coupling completed position in such a way as to overcharge said connector in the direction to couple said connector with said terminal of said peripheral equipment and then to pull out said connector from said terminal of said peripheral equipment along said second cam, in demounting said peripheral equipment from said adapter device.

29. An adapter device according to claim 26, further comprising an elastic member arranged to cause said peripheral equipment to be detached from said connector in demounting said peripheral equipment from said adapter device.

30. An adapter device according to claim 24, wherein said first and second lock mechanism parts are arranged to fix said peripheral equipment to said adapter device by causing pin members which protrude according to the operation of said operation lever to be fitted into hole parts of said peripheral equipment.

31. An adapter device according to claim 21, wherein said peripheral equipment is a digital still camera which digitally records a still image on a recording medium.

32. An adapter device for connecting a peripheral equipment to and electric apparatus and for disconnecting said peripheral equipment from said electric apparatus, comprising:
(a) a body formed approximately in a rectangular parallelepiped shape having respective first and second longitudinally displaced surfaces;
(b) a first electrical connector disposed on an upper surface of said body and movable in a first direction for connection with said peripheral equipment;
(c) a second electrical connector disposed at said first surface of said body and arranged for connection with said electric apparatus; and
(d) an operation member disposed at said second surface of said body and engageable exteriorly of said body and movable in a second direction orthogonal to said first direction for electrically connecting said peripheral equipment to said first electrical connector, said operation member disconnecting said peripheral equipment from said electric apparatus by movement of said operation member in a third direction, said third direction being opposite said second direction.

33. An adapter device according to claim 32, further comprising holding members arranged to hold said peripheral equipment and disposed at end parts of the upper surface of said body in the longitudinal direction thereof.

34. An adapter device according to claim 33, wherein said holding members are provided with first and second lock mechanism parts for fixing said peripheral equipment to said adapter device.

35. An adapter device according to claim 34, wherein said first and second lock mechanism parts are provided with pin members for fixing diagonal parts of said peripheral equipment connected to said first connector.

36. An adapter device according to claim 32, wherein said peripheral equipment has an opening part for loading and unloading an interchangeable recording medium, and wherein, when said peripheral equipment is fixed to said adapter device, one side of said peripheral equipment in which said opening part is formed is on the same side as one side of said adapter device on which said operation member is disposed.

37. An adapter device according to claim 36, wherein said peripheral equipment has an opening/closing member which is provided for opening and closing said opening part and which is disposed on the same plane as one of said holding members, and wherein said one of said holding members is formed in such a shape as not to interfere with an operation of said opening/closing member.

38. A peripheral equipment adapted to be connected to an adapter device according to claim 32, said peripheral equipment having a terminal to be connected to said first connector.

39. An adapter device according to claim 32, wherein said adapter device is arranged to transmit an image signal outputted from said peripheral equipment to said electric apparatus.

40. An adapter device according to claim 39, further comprising indication means for providing an indication that the image signal is being communicated, when the image signal is being transmitted from said peripheral equipment to said electric apparatus.

41. An adapter device according to claim 32, further comprising a power input terminal.

42. An adapter device according to claim 41, further comprising a battery charger.

43. An adapter device according to claim 41, further comprising a remote operation terminal for connection with a remote operation device used to perform a remote operation of said peripheral equipment.

44. An adapter device according to claim 41, wherein said peripheral equipment is a digital still camera which digitally records a still image on a recording medium.

45. An adapter device according to claim 44, wherein said recording medium is a PCMCIA memory card.

* * * * *